Feb. 27, 1968   A. CZARNECKI ETAL   3,370,723
WORK TRANSFER APPARATUS
Filed Sept. 20, 1965   7 Sheets-Sheet 1
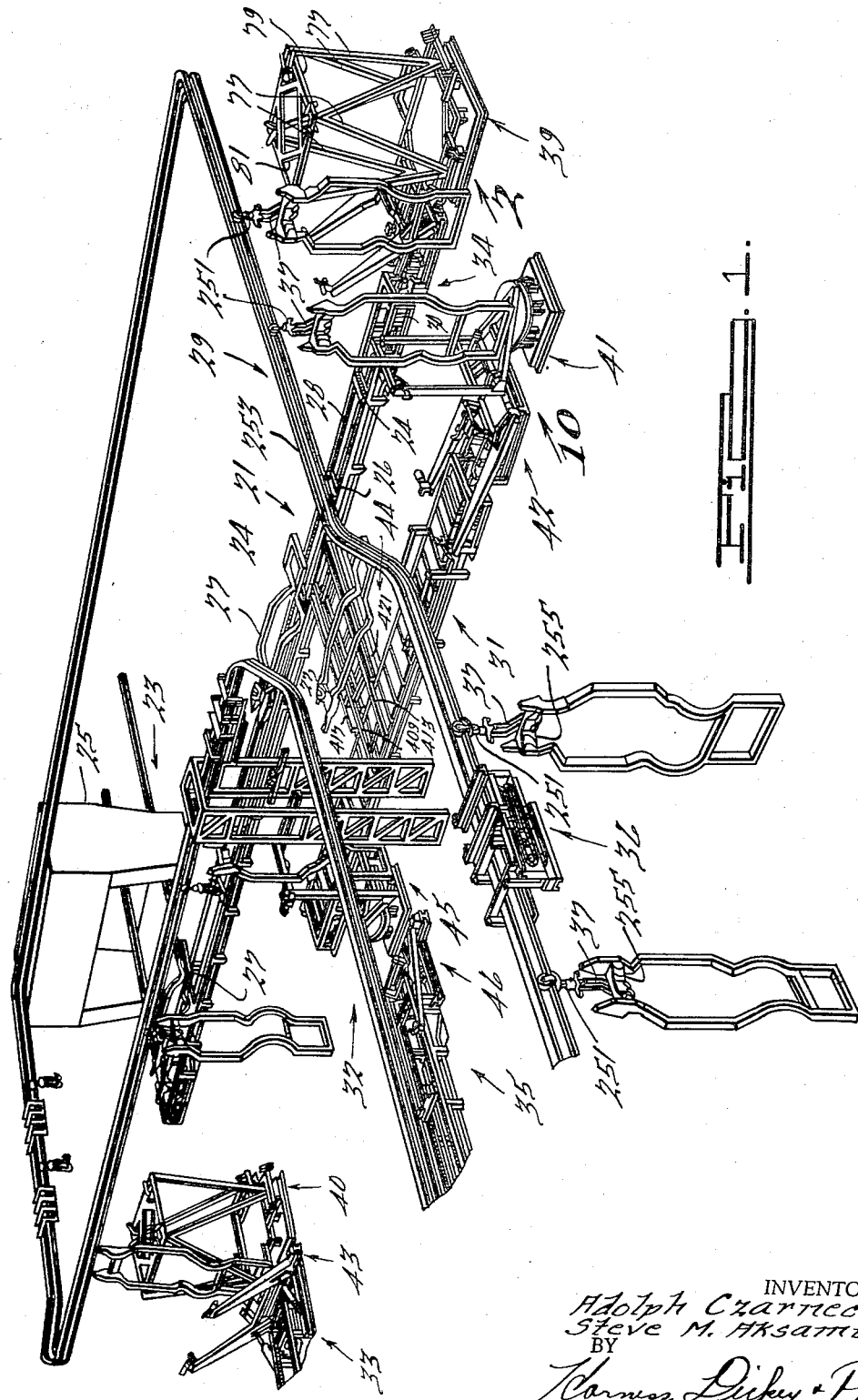
INVENTORS.
Adolph Czarnecki.
Steve M. Aksamit.
BY
Carnes, Dickey & Pierce.
ATTORNEYS.

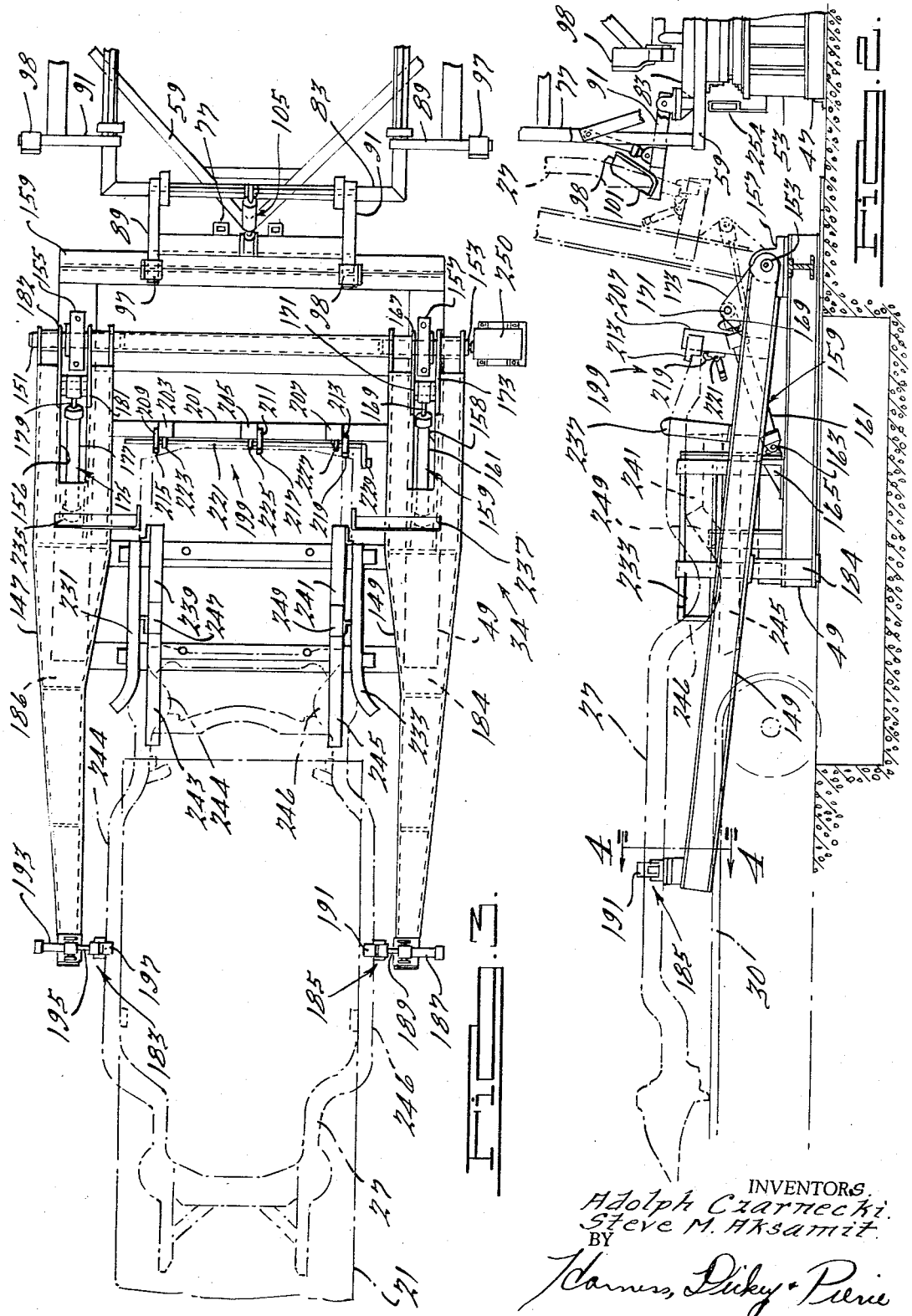

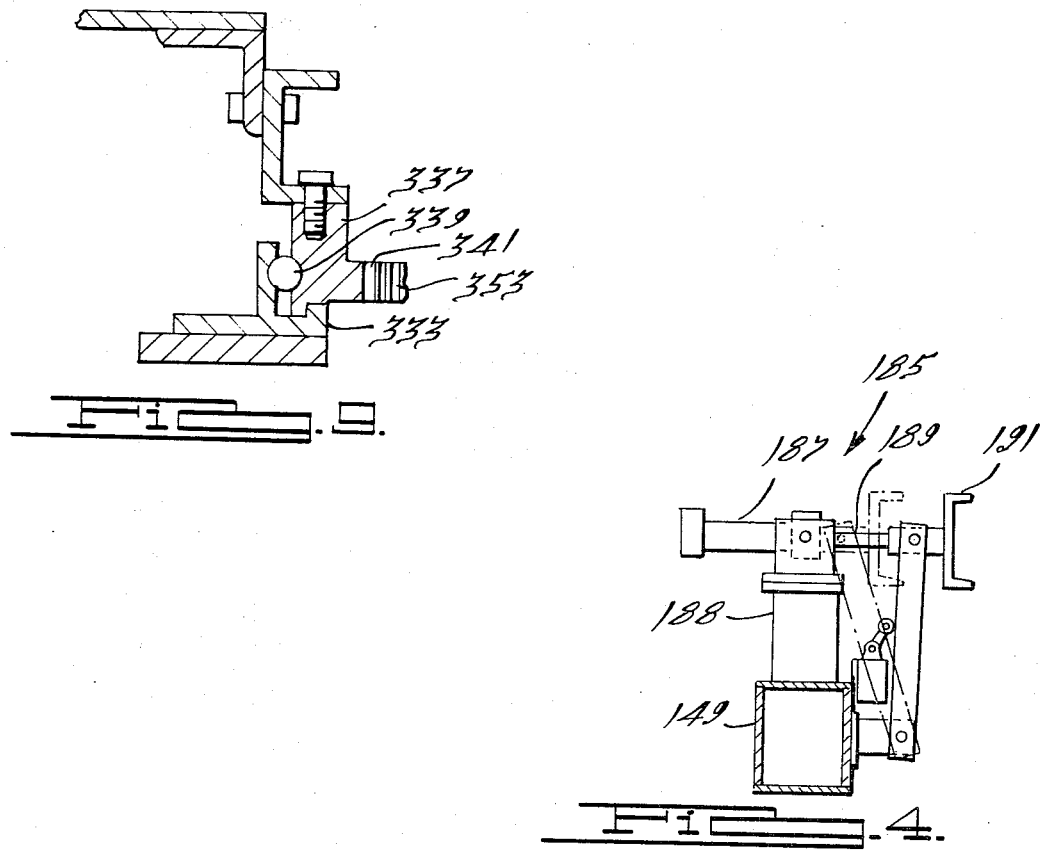

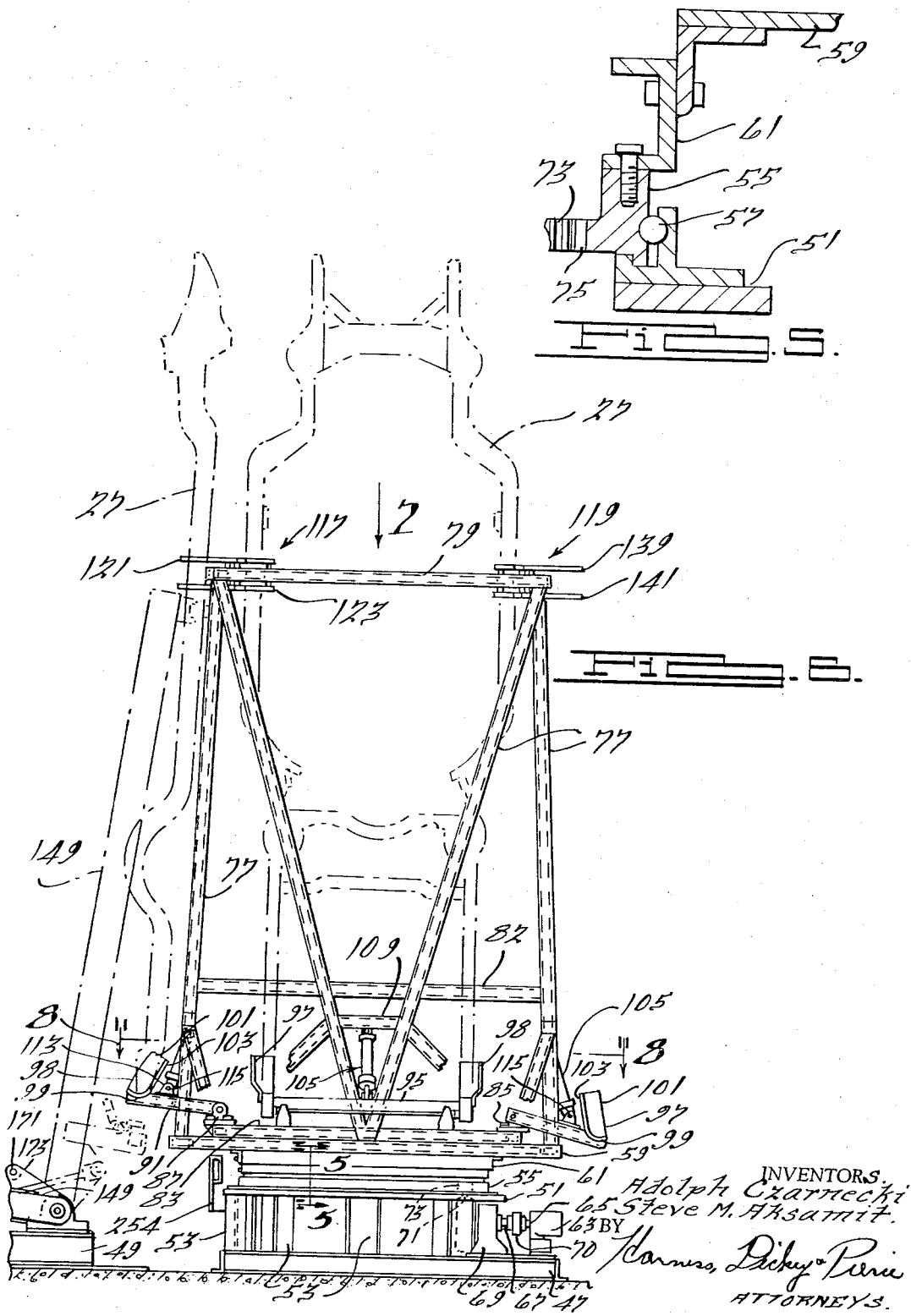

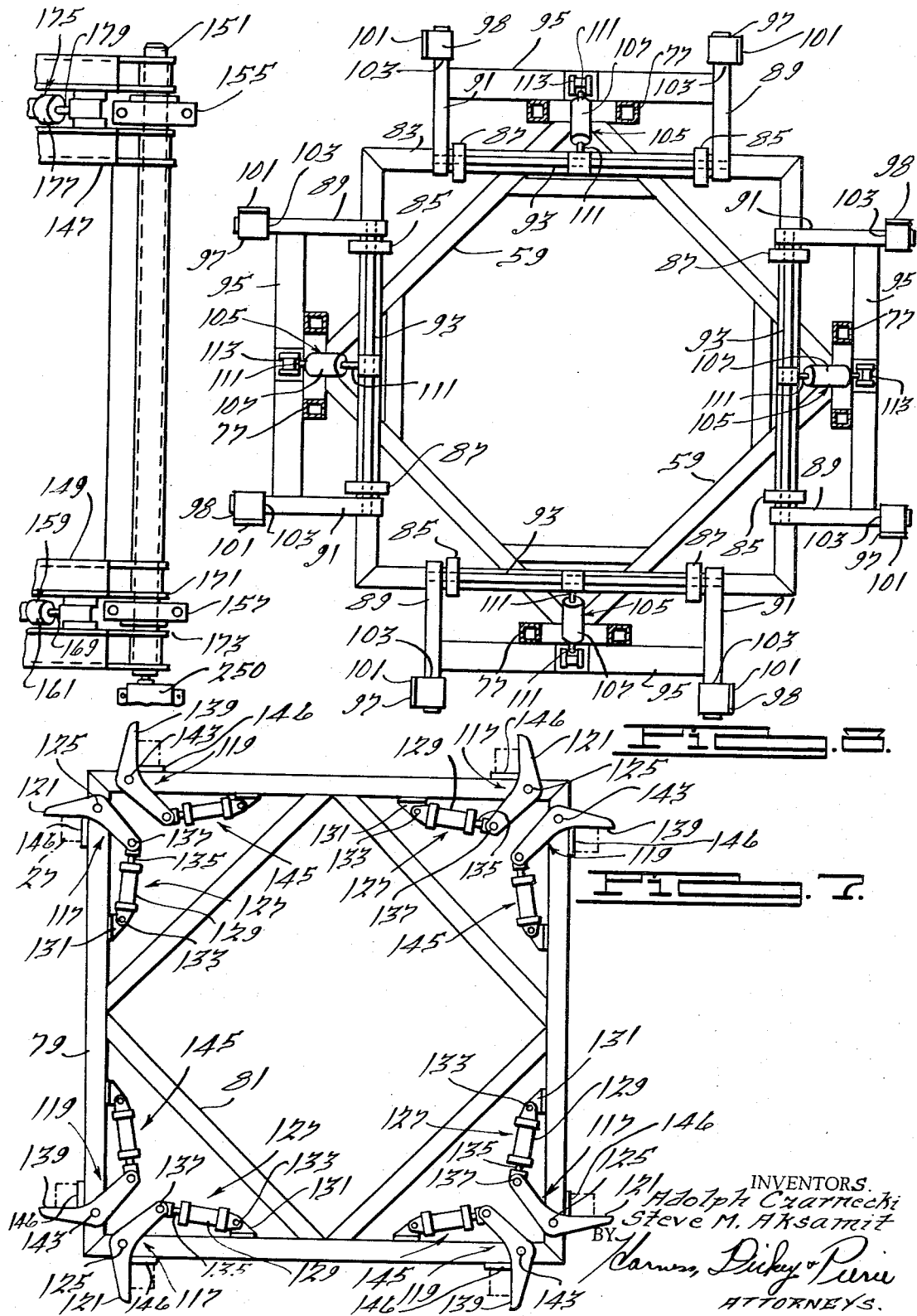

Feb. 27, 1968     A. CZARNECKI ETAL     3,370,723
WORK TRANSFER APPARATUS
Filed Sept. 20, 1965     7 Sheets-Sheet
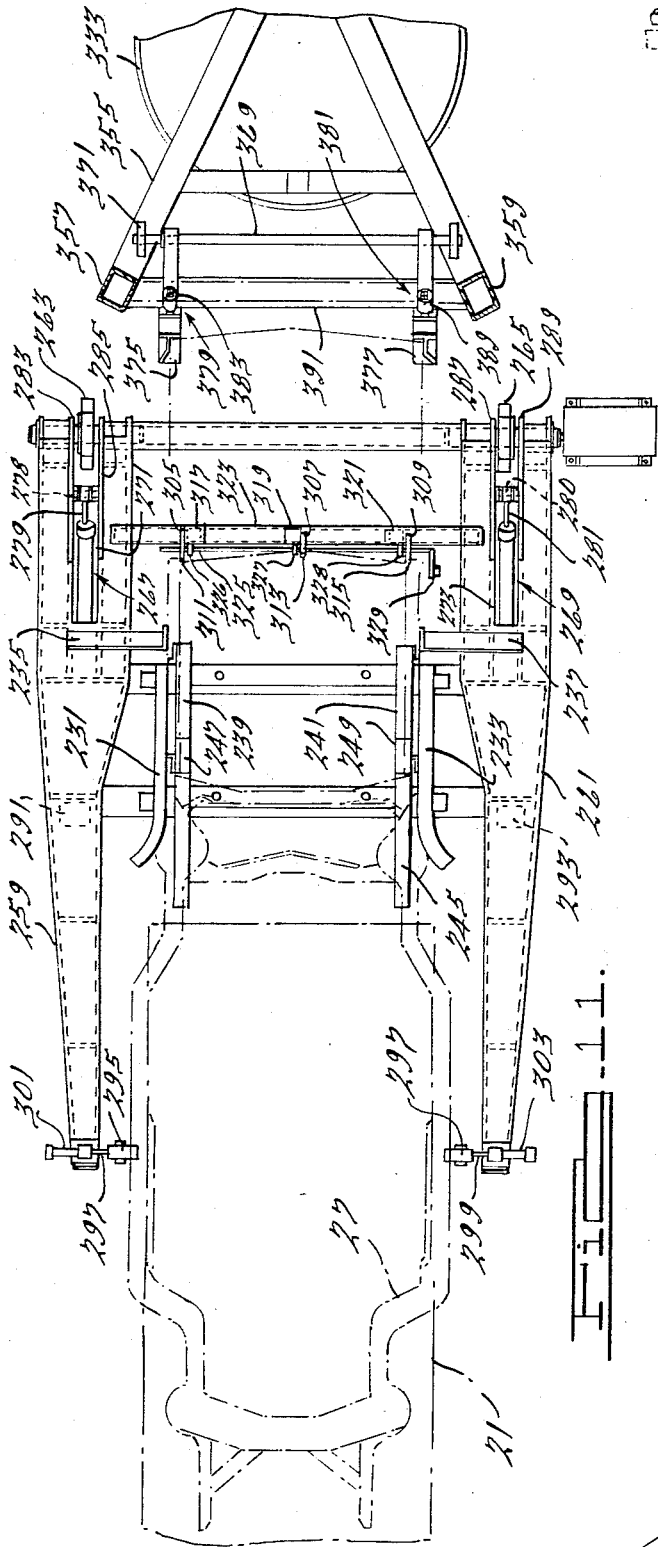
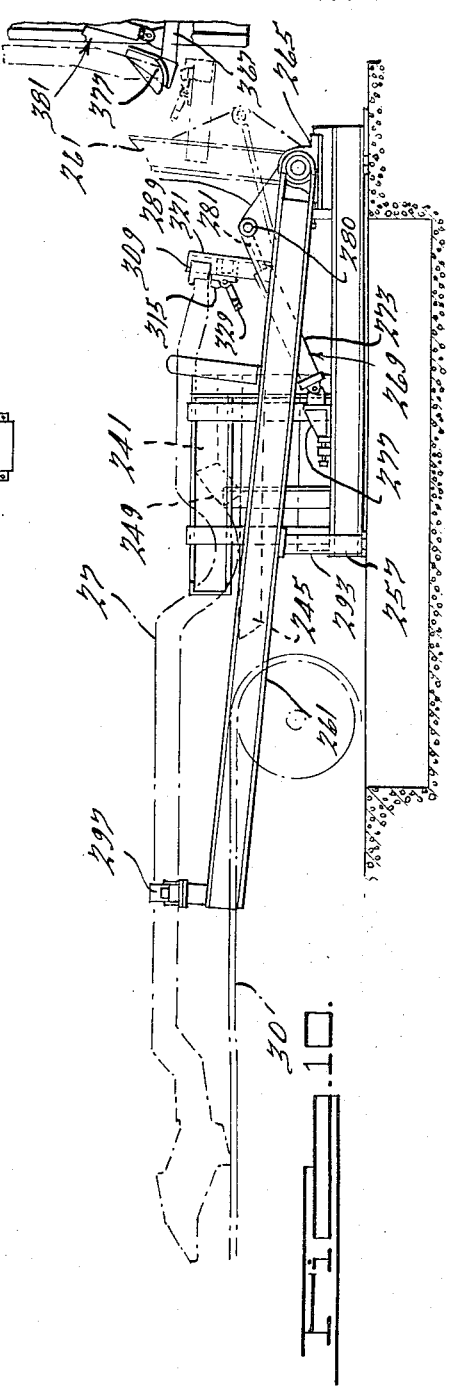
INVENTORS.
Adolph Czarnecki.
Steve M. Aksamit.
BY
Harness, Dickey & Pierce
ATTORNEYS.

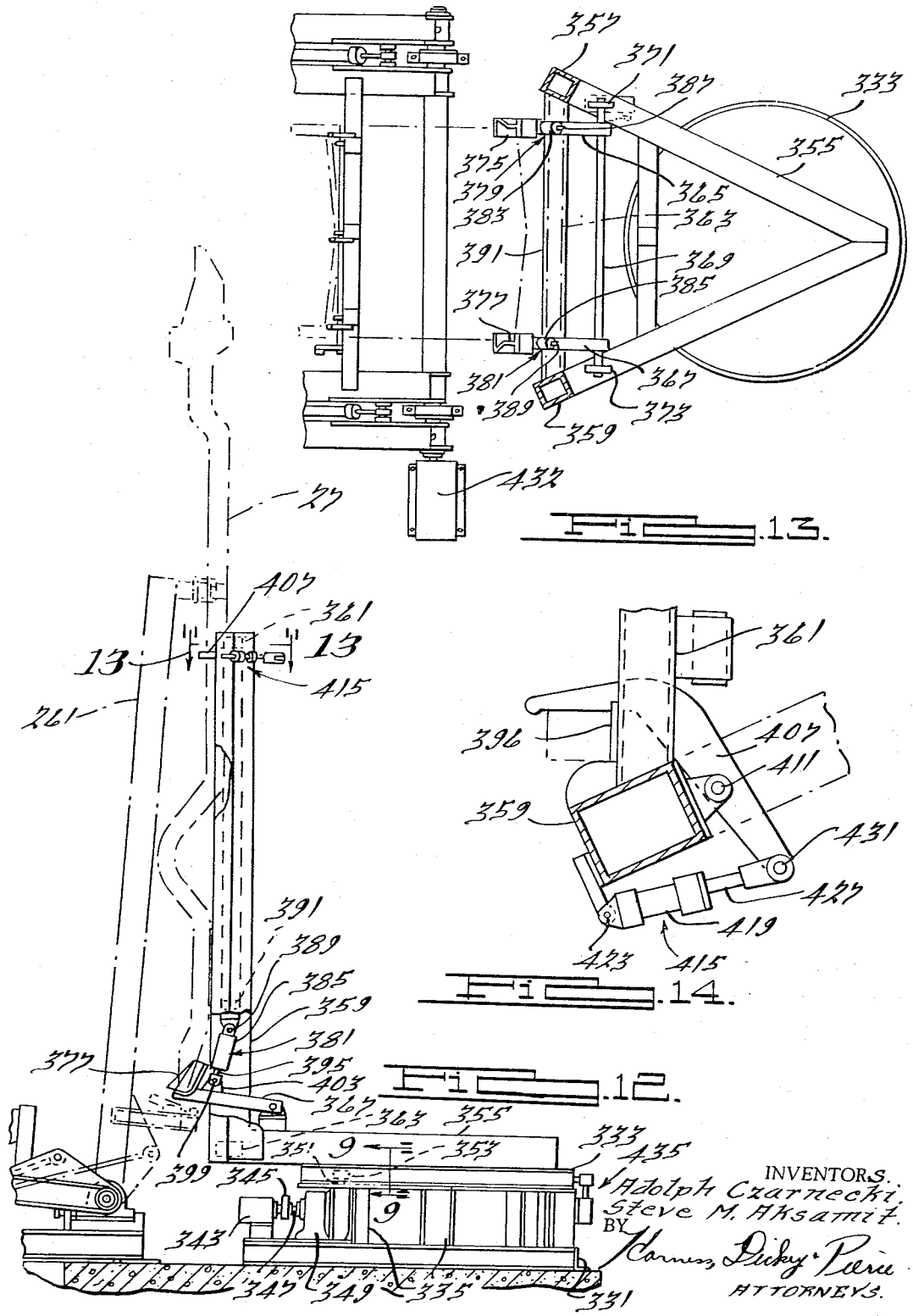

United States Patent Office 3,370,723
Patented Feb. 27, 1968

3,370,723
WORK TRANSFER APPARATUS
Adolph Czarnecki, Birmingham, and Steve M. Aksamit, Melvindale, Mich., assignors to Anchor Steel & Conveyor Company, Dearborn, Mich., a corporation of Michigan
Filed Sept. 20, 1965, Ser. No. 488,623
23 Claims. (Cl. 214—91)

ABSTRACT OF THE DISCLOSURE

A workpiece transfer device comprising a first conveyor means for transferring a workpiece along a predetermined path, a tip-arm assembly adjacent the path and adapted to transfer the workpiece to a generally upright position, a turnstile having clamping means thereon for supporting the workpiece in the upright position, means for indexing said turnstile through successive increments of less than 360°, and a second conveyor means for transferring a workpiece along a path substantially aligned with the indexed position of the turnstile.

The purpose of the above abstract is to provide a nonlegal technical statement of the disclosure of the contents of the instant patent application and thus serve as a searching-scanning tool for scientists, engineers and researchers. Accordingly, this abstract is not intended to be used in understanding or otherwise comprehending the principals of the present invention hereinafter described in detail, nor is it intended to be used in interpreting or in any way limiting the scope or fair meaning of the claims appended hereto.

---

This invention relates generally to work transfer devices, and particularly to one adapted to continuously and automatically transfer and at the same time orient relatively large and heavy workpieces.

The device of the present invention is particularly useful in transferring relatively large and heavy workpieces from one production assembly conveyor, hereinafter referred to as a delivery conveyor, to a receiving conveyor automatically and at a rate compatible with an established rate of the delivery conveyor wherein the workpieces must be oriented from their position on the delivery conveyor to a different position on the receiving conveyor. For example, automobile frames emerge from their forming mills on an intermittently operating delivery conveyor and necessarily in a generally horizontal position. One conventional forming mill delivers formed frames at a rate of about one every 12 or 13 seconds and it is necessary that these frames, before being shipped, be painted to protect their outer surface from rust, corrosion, etc. For proper handling during the painting operation, it is necessary that the frames be spaced from each other and that as much of the frame as possible be exposed for the painting operation. Thus, an overhead trolley-type receiving conveyor having spaced hooks from which the frames are individually and vertically suspended has been found to produce best results.

Initially, then, a device is needed to transfer the frames from a horizontal position on the delivery conveyor as delivered from the forming mill to a vertical position for the overhead receiving conveyor.

The main difficulty arising in developing a transfer device of this type arises from the fact that these frames are relatively heavy (about 250 lbs.) and the transfer cycle necessarily includes dwell periods because of intermittent delivery of the frames from the forming mill or delivery conveyor and intermittent frame pickup by the overhead receiving conveyor. Thus, a transfer device which would receive the frames from the forming mill conveyor, orient the frames and deliver them directly one at a time to the overhead receiving conveyor must cycle completely every 12 or 13 seconds to be compatible with the rate of delivery of the frames from the forming mill. To achieve this, and allowing for the above-mentioned dwell periods in the system, the motions of the transfer device must necessarily be exceedingly rapid. This added to the heavy frame weight and the corresponding heavy construction required of the transfer mechanism results in frequent parts failures and down time and adds considerably to the overall cost of the automobile frame. Thus, a more important requirement of the transfer device is that it be capable of orienting and transferring these relatively heavy workpieces at a rate consistent with the rate of the delivery conveyor.

A related and somewhat similar problem arises in handling these frames after being painted. Thus, these frames conventionally are stacked one on top of the other pursuant to loading and shipping, and it becomes necessary to transfer the frames from a vertical suspended position as held by the overhead conveyor to a horizontal position on a bed-type conveyor. Again, it is important that this transfer of frames be effected at a rate consistent with the delivery conveyor which, in this case, is the overhead conveyor. Substantially the same weight and dwell problems arise here as did in the transfer system described above, the only difference being that the transfer movement sequence is opposite. Advantageously, then, a device constructed to effect continuous and automatic transfer of these workpieces from one conveyor to another and at the same time orient them from a horizontal to a vertical position at a rate consistent with the established rate of the delivery conveyor could be reversed in operation to effect transfer and orientation from a vertical position on one conveyor to a horizontal position to another.

Main objects of the present invention, therefore, are a transfer device for relatively large and heavy workpieces adapted to automatically and continuously orient and transfer these workpieces from a delivery conveyor to a receiving conveyor at a relatively rapid rate consistent with the rate of the delivery conveyor.

Further objects include a transfer device of the above character which is relatively inexpensive to manufacture, rugged in construction and reliable in use.

Other objects and advantages of the present invention will become more apparent from a consideration of the following detailed description taken in conjunction with the drawings in which:

FIG. 1 is a perspective view illustrating a plant layout and conveyor system embodying the present invention;

FIG. 2 is an enlarged side elevational view of a portion of one workpiece transfer device looking in the direction of the arrow 2 of FIG. 1;

FIG. 3 is a top plan view of the structure of FIG. 2;

FIG. 4 is an enlarged sectional view of the structure of FIG. 2 taken along the line 4—4 thereof;

FIG. 5 is an enlarged sectional view of a portion of FIG. 6 taken along the line 5—5 thereof;

FIG. 6 is an enlarged fragmentary side elevational view of the other portion of the workpiece transfer device of FIG. 2 looking in the direction of the arrow 2 of FIG. 1;

FIG. 7 is a top plan view of the structure of FIG. 6 looking in the direction of the arrow 7;

FIG. 8 is a sectional view of the structure of FIG. 6 taken along the line 8—8 thereof;

FIG. 9 is an enlarged sectional view of a portion of FIG. 12 taken along the line 9—9 thereof;

FIG. 10 is an enlarged side elevational view of a portion of another workpiece transfer device of the present invention looking in the direction of the arrow 10 of FIG. 1;

FIG. 11 is a top plan view of the structure of FIG. 10;

FIG. 12 is an enlarged side elevational view of the other portion of the workpiece transfer device of FIG. 10 looking in the direction of the arrow 10 of FIG. 1;

FIG. 13 is a top plan view of the structure of FIG. 12; and

FIG. 14 is an enlarged sectional view of the structure of FIG. 12 taken along the line 14—14 thereof.

Broadly described, the present invention includes a workpiece turnstile intermediate a workpiece delivery and workpiece receiving conveyor adapted to support one or more workpieces in a generally upright position and indexible in increments of less than 360° and constructed to transfer workpieces between said receiving conveyor and said generally upright position on said turnstile, and a tip-arm assembly adjacent the turnstile adapted to transfer workpieces between the delivery conveyor and said generally upright position on said turnstile.

Referring now more specifically to the drawings, FIG. 1 illustrates an automobile frame handling conveyor system embodying the present invention. As shown there, a flat-bed intermittent type conveyor assembly generally indicated at 21 is positioned to receive automobile frames after completion of the last stage of the frame forming operation in a frame forming mill 23. As shown in the figure, a press 25 can perform the final forming step for successive ones of automobile frames 27. The conveyor 21 may be of any suitable intermittent type and is provided with spaced workpiece supporting pocket members 24, 26. Conveniently, the pocket members 24, 26 are fixed to laterally spaced endless chains 28, 30 and are suitably spaced to receive and support the workpiece frames 27 in appropriately spaced positions thereon. The chains 28, 30 are conjointly moved by drive means (not shown) which is synchronized with the feeding movement of the frames 27 from the press 25. Drive and synchronizing means of this type are well known in the art and since they form no part of the present invention, are not illustrated or described further here.

The conveyor 21, here the delivery conveyor, feeds the workpiece frames 27 to a tip-arm assembly 34 which places the workpiece frames 27 on a turnstile 39 which, in turn, indexes in 90° increments after each workpiece frame 27 is placed in an upright position thereon. An overhead, trolley-type conveyor 29, here, the receiving conveyor, has spaced interconnected hooks 37 adapted to pick up and carry each of the workpiece frames 27 from the turnstile 39 upon being indexed 90° from a position adjacent the tip-arm assembly 34. The overhead trolley conveyor 29 carries the workpiece frames 27 past a turning device 36 which turns the hooks 37 and the frames 27 90° about a vertical axis in which position they are fed to the painting station (not shown). After being painted, the hooks 37 and associated workpiece frames 27 are conveyed along the return side 32 of the overhead conveyor, now the delivery conveyor, are turned 90° by a turning device similar to that shown at 36 and are fed to a turnstile 40 structurally identical to the turnstile 39 and which picks the workpiece frames 27 from the hooks 37. The turnstile 40 indexes 90° after each workpiece frame 27 is positioned thereon, whereupon a tip-arm assembly 43, structurally identical to the tip-arm assembly 34, grips each workpiece frame and positions it on a flat-bed, intermittent type conveyor 33 which, in this case, is the receiving conveyor.

For reasons either of special handling of certain ones of the workpiece frames 27 or to increase the rate of workpiece transfer, an auxiliary turnstile 41 may be provided intermediate an auxiliary delivery conveyor 31 and the overhead trolley-type receiving conveyor 21. The auxiliary delivery conveyor 31 is adapted to receive selected ones of the workpiece frames 27 from the conveyor 21 by means of a walking beam type shuttle device 44 and feeds these workpiece frames 27 to an auxiliary tip-arm assembly 42 which places the workpiece frames in a generally upright position on the auxiliary turnstile 41. After one of the workpiece frames 27 is placed on the auxiliary turnstile 41, it is indexed 90° and the workpiece frame picked up by one of the conveyor hooks 37 in the same manner as with the turnstile 39. Here, since only selected ones of the workpiece frames 27 are handled by this auxiliary assembly, it is able to effect complete transfer of each workpiece frame 27 before another is delivered thereto. Thus, the turnstile 41 instead of indexing in one continuous direction through 90° intervals simply indexes back 90° after delivering one workpiece frame 27 in preparation to receive the next workpiece frame. The auxiliary delivery conveyor 31 can, if desired, be constructed and operate somewhat the same as the delivery conveyor 21; however, since only selected workpiece frames 27 are handled thereby, no critical timing relation exists therefor and it can, as shown, be simply a continuously moving slat-type endless conveyor.

In the same fashion, an auxiliary turnstile 45 and an auxiliary tip-arm assembly 46 can be provided intermediate the return side 32 of the overhead conveyor and an auxiliary receiving conveyor 35. This auxiliary assembly preferably is structurally identical to the auxiliary turnstile 41 and tip-arm 42 and transfers the same selected ones of the workpiece frames from the delivery conveyor 32 to the auxiliary receiving conveyor 35.

Turning now to FIGS. 2–8, wherein the turnstile 39 and tip-arm assembly 34 are illustrated in detail, the turnstile 39 is shown supported on a base 47 and the tip-arm assembly 34 supported on a base 49. An outer annular support ring 51 of the turnstile 39 is fixedly secured above the base 47 by a plurality of upwardly extending legs 53 bolted, welded or otherwise suitably interconnected with the base and ring. An inner annular ring 55 is rotatably supported within the outer ring 51 through balls 57, the inner and outer ring formed with ball races at confronting surfaces and the inner ring being secured to a rectangular lower turnstile frame 59 by an annular brace assembly 61 (see FIG. 5).

A drive means is provided to index the lower turnstile frame 59 relative to the support frame 47 and is seen to include a hydraulic motor 63 having an output shaft 65 rotatably secured to an input shaft 67 of a speed reducer 69 through a coupling 70. The speed reducer 69 has an output shaft 71 perpendicular to the input shaft 67 with a drive pinion 73 secured thereto for rotation therewith. The pinion 73 engages an internal ring gear 75 formed on the inner ring 55 so that as the drive pinion 73 is rotated by the motor 63, it rotates the inner ring 55 and turns the lower turnstile frame 59.

A set of four generally V-shaped arms 77 are secured at their base, one each at a respective corner of the lower turnstile frame 59. The upper ends of each of the arms 77 are secured to the ends of adjacent ones of the arms 77. A rectangular upper turnstile frame 79 envelopes and is welded or otherwise secured to the arms 77 with the secured arm upper ends disposed at the corners of the frame 79. A skeleton rectangular frame or brace 81 is secured to or integral with the upper turnstile frame 79 for reinforcement thereof. The lower portions of the arms 77 are reinforced by a skeleton brace 82 welded or otherwise fixed thereto.

The turnstile 39 is adapted to support ones of the workpiece frames 27 during transfer thereof. To this end, a rectangular structural frame 83 overlies and is secured to the lower turnstile frame 59 for turning movement therewith, the structural frame 83 being displaced 45° relative to the lower turnstile frame 59. Each of the four sides of the structural frame 83 has a spaced pair of pivot supports 85, 87 secured thereto at the middle thereof. A pair of lift arms 89, 91 is pivotally mounted on the supports 85, 87 by a pivot rod 93 extending through the supports 85, 87 and each pair of arms is interconnected by a brace 95. A pair of lift pockets 97, 98, each having a curved bottom wall 99 and an upwardly extending outer side and back wall 101, 103, respectively, is secured to each of the lift arms 89, 91 adjacent their outer end. In use, a workpiece frame 27 has its lower end supported by and within the lift pockets 97, 98 on a pair of lift arms 89, 91 and the upper portion of the workpiece frame 27 leans against the upper turnstile frame 79 substantially in the manner illustrated by dot-dash lines in FIG. 6.

Each pair of lift arms 89, 91 is pivoted on its pivot rod 93 by actuation of one of a set of hydraulic motors 105. As shown in FIGS. 6 and 8, each of the hydraulic motors 105 includes a cylinder 107 pivotally secured o a strut 109 interconnecting each pair of arms 77 and a piston rod 111 pivotally secured to a pivot support 113 on the brace 95 by a pivot pin 115. Thus, when pressure fluid is admitted to one of the cylinders 107 to retract its piston rods 111, the lift arms 89, 91 and the lift pockets 97, 98 swing upwardly and raise the lower end of the workpiece frame 27 supported thereby.

A pair of upper clamps 117, 119 is secured to each side of the rectangular upper turnstile frame 79 adjacent opposite ends thereof. As seen in FIGS. 6 and 7, each clamp 117 includes a pair of identical angle arms 121, 123 disposed above and below the upper turnstile frame 79, respectively, and pivotally mounted thereon by a pin 125. A hydraulic motor 127 is secured to each side of the upper turnstile frame 79 to simultaneously manipulate each set of clamp arms 121, 123 of the clamps 117. Thus, each of the motors 127 includes a cylinder 129 pivoted to a support 131 on the frame 79 by a pin 133, and a piston rod 135 pivotally secured to the arms 121, 123 by a pin 137.

Similarly, each of the clamps 119 includes a pair of spaced arms 139, 141 pivoted on the frame 79 by a pin 143 and conjointly motivated by a hydraulic motor 145. Thus, when the hydraulic motors 127, 145 of one pair of clamps 117, 119 are energized to extend their respective piston rods, the clamp arms 121, 123 and 139, 141 swing inwardly toward each other and prevent a workpiece frame 27 supported by the pockets 97, 98 and leaning against pads 146 on the upper turnstile frame 79 between the clamps 117, 119 from falling away from the turnstile 39. Preferably, the clamp arms 121, 123 and 139, 141 do not tightly grip the workpiece frame 27 but simply prevent it from falling away from the turnstile 39 during movement thereof. When the motors 127, 145 are energized to retract their piston rods, the clamp arms 121, 123 and 139, 141 swing outwardly and permit the workpiece frames 27 to be placed against or removed from the turnstile during the transfer sequence in a manner to be described.

Means is provided to tip the frames 27 from a generally horizontal position on the delivery conveyor 21 to an upright, slightly inclined position resting against the upper turnstile frame 79 and seated in the lift pockets 97, 98. To this end, a tip-up-arm assembly 34 shown in FIGS. 2 and 3 and partly in FIGS. 6 and 8 is provided. This tip-up arm assembly 34 is supported on the support frame 49 and is positioned between the exit end of the delivery conveyor 21 and the turnstile 39. Thus, a pair of arms 147, 149 are pivotally supported on the frame 49 through pivot pins 151, 153 supported in a spaced pair of bearing blocks 155, 157 positioned in slotted openings 156, 158 in the arms 147, 149, respectively. A hydraulic motor 159 has a cylinder 161 pivoted at one end by a pin 163 to a pivot support 165 secured to the frame 149. The cylinder 161 extends into the slot 158 in the arm 149 and has a piston rod 169 slidable therewithin. The outer end of the piston rod 169 is pivotally secured by a pin 171 to a pair of plates 167, 173 fixed to the arm 149 at either side of the slot 158. Similarly, a hydraulic motor 175 has its cylinder 177 pivoted on the frame 49 and disposed in the slot 156 in the arm 147. The motor 175 has its piston rod 179 pivotally secured to a pair of plates 181, 182 on the arm 147. The hydraulic motors 159, 175 are adapted for simultaneous actuation so that when pressure fluid is admitted to the cylinders 161, 177 and the piston rods 169, 179 extended, the arms 147, 149 tip upwardly or clockwise as seen in FIG. 2. Conversely, when the piston rods 169, 179 are retracted, the arms 147, 149 return or swing counterclockwise as seen in the figure to their "down" position where they seat upon a pair of stops 184, 186.

Each of the arms 147, 149 has a workpiece frame clamping assembly 183, 185, respectively, at its end spaced from the pivot pins 151, 153. Thus, as seen in FIGS. 2 and 3 and perhaps most clearly in FIG. 4, a hydraulic cylinder 187 is fixed to the arm 149 through a support 188 and has a piston rod 189 slidable therein provided with a generally U-shaped clamp plate 191 secured to its end. The arm 147 has an identical cylinder 193 fixed thereto and slidably receiving a piston rod 195 provided with a U-shaped clamp plate 197 which faces the clamp plate 191. The piston rods 189, 195 are adapted for simultaneous actuation so that when extended, the clamp plates 191, 197 moved toward each other and grip a workpiece frame 27 shown in dot-dash lines in FIGS. 2 and 3. Conversely, when the piston rods 189, 195 are retracted, the clamp plates move away from each other and the workpiece frame 27 is released.

In addition to the clamp plates 191, 197, the arms 147, 149 are provided with a supporting seat assembly for the leading end of the workpiece frame 27 as it moves into position between the arms 147, 149 under the control of the delivery conveyor 21. This seat assembly is generally indicated at 199 and includes a cross beam 201 extending between and secured to the arms 147, 149. A plurality of posts 203, 205, 207 are fixed to and extend upwardly from the cross beam 201 at spaced locations therealong and each of the posts has an abutment block 209, 211, 213, respectively, secured thereto. The outer end of each of the blocks 209, 211, 213 has an inverted generally L-shaped configuration and is adapted to receive and have the leading end of a workpiece frame 27 seated thereagainst as delivered by the conveyor 21. A plurality of flop dogs 215, 217, 219 are pivotally mounted one each below each of the abutment blocks 209, 211, 213, respectively. The flop dogs 215, 217, 219 are each secured to a shaft 221 turnably supported within spaced bearing blocks 223, 225, 227 secured to the posts 203, 205, 207, respectively. Each of the flop dogs 215, 217, 219 has a flat upper surface which, together with the inverted L-shaped abutment block configuration, provides a plurality of generally channel-shaped pockets adapted to seat and support the leading end of a workpiece frame 27. A counterweight 229 fixed to the shaft 221 normally biases the shaft 221 in a counterclockwise direction as seen in FIG. 2 holding the flop dogs in the position illustrated. Stops (not shown) may be provided to limit counterclockwise turning of the shaft 221 to the position shown in FIG. 2.

In use, a workpiece frame 27 is delivered from the conveyor 21 between the arms 147, 149 with the leading end of the workpiece frame seating in the channel-shaped pockets formed between the abutment blocks 209, 211, 213 and the flop dogs 215, 217, 219. Thereafter, the piston rods 189, 195 are extending and the clamp plates 191, 197 grip the workpiece frame 27. The piston rods 169, 179 of the motors 159, 175 are then extended upon delivery of fluid pressure to the cylinders 161, 177 causing the arms 147, 149 to swing upwardly or clockwise as seen in FIG. 2 to the upper position shown partially in dot-dash lines and carrying the workpiece frame 27 therewith. At this upper position, the leading end of the workpiece frame 27, now the lower end, is held substantially directly above an adjacent set of lift pockets 97, 98 fixed to the arms 89, 91 on the turnstile 39. At this point, this set of arms 89, 91 are in a downward pivoted position from that illustrated in FIG. 2, the piston rod 111 of the associated motor 105 being extended relative to the cylinder 107. Thereafter, pressure fluid is admitted to the motor 105 to retract the piston rod 111 and swing the arms 89, 91 and the lift pockets 97, 98 upwardly to the position shown in FIG. 2. The lift pockets 97, 98 engage the workpiece frame 27 at its ends, outwardly of the seating assembly 199 and when swung upwardly, lift the workpiece frame 27 therefrom. The clamp plates 191, 197 are retracted and released from the workpiece frame 27 when the lift pockets 97, 98 begin lifting the workpiece frame and the upper portion thereof moves against the pads 146 on the upper turnstile frame 79. Thereafter, the motors 127, 145 are energized and move the clamps 117, 119 toward each other, thereby holding the workpiece frame 27 from falling away from the turnstile 39. Since the workpiece frame 27 has now been lifted from the seating assembly 199, the arms 147, 149 can swing downwardly or counterclockwise as viewed in FIG. 2 in preparation for handling the next workpiece frame delivered by the conveyor 21.

As described above, the conveyor 21 is constructed to move in intermittent fashion with the workpiece frames 27 disposed thereon in predetermined spaced relation. Manifestly, the feed movement of the conveyor 21 is such that at the end of a feed stroke, the leading end of a workpiece frame 27 is in seated relation to the channel-shaped pockets on the seating assembly 199. The flop dogs 215, 217, 219 are pivotally mounted through the shaft 221, as described above, so that if for some reason the arms 147, 149 are not fully "down" when the workpiece frame 27 is fed forward by the conveyor 21 into position between the arms 147, 149, the leading end of the positioned workpiece frame 27 will engage the front edge of the flop dogs 215, 217, 219 as the arms 147, 149 complete their downward movement. This causes the flop dogs and the shaft 221 to turn clockwise, as viewed in FIG. 2 until the flop dogs and the arms 147, 149 are fully down, whereupon the counterweight 229 turns the shaft 221 and the flop dogs 215, 217, 219 counterclockwise. In this way, additional time is given to complete travel of the relatively heavy tip-up arms 147, 149 thereby putting less strain on the moving parts.

Means is provided to laterally guide the particular workpiece frames 27 into position between the tip-up arms 147, 149 and to support the leading end of each workpiece frame after it leaves the end of the delivery conveyor 21. Thus, as seen in FIGS. 2 and 3, a pair of lateral guides 231, 233 are fixed to the base 49 and have their ends near the conveyor 21 flared outwardly to receive and guide the workpiece frame 27 accurately between the arms 147, 149. If desired, a pair of generally L-shaped upstanding guide arms 235, 237 are secured to the arms 147, 149, respectively, adjacent to and coextensive with the other end of the side guides 231, 233 to further guide the workpiece frame and to prevent it from becoming misaligned during the tip-up operation of the arms 147, 149. A pair of slide guides 239, 241, secured to the base 49, are each provided with lower arms 243, 245, and with tapered portions 247, 249, respectively. The arms 243, 245 extend substantially to the end of the delivery conveyor 21 but do not interfere with its operation. The particular workpiece frames 27 have belly portions 244, 246 which are slidably supported by the lower arms 243, 245 as the workpiece frame 27 comes off the end of the delivery conveyor 21. The guide tapered portions 247, 249 are positioned so as to be adjacent the leading portion of the workpiece belly when the conveyor 21 has moved the workpiece frame 27 into position between the tip-up arms 147, 149 and with its leading end engaging the seating assembly 199, the slide guides preventing the workpiece frame 27 from falling by its own weight before its leading end becomes seated.

Once the workpiece frame 27 has been placed on the turnstile 39 by the tip-up arms 147, 149, the turnstile 39 is indexed 90° to position this workpiece frame 27 to be picked up by the overhead trolley conveyor 29 and to position a vacant side of the turnstile 39 adjacent the tip-up arm assembly 34 to receive the next workpiece frame 27. Conventionally, the overhead trolley conveyor 29 has spaced interconnected trolleys 251 adapted for travel along an overhead track 253 and moved by a power means (not shown). The trolleys 251 each have a workpiece holding hook 37 suspended therefrom in the manner shown. These hooks 37 are adapted to engage and pick a workpiece frame 27 from the turnstile 39 after it has indexed 90° from the tip-up arm assembly 34. Thus, the trolley conveyor 29 has its track 253 running transversely to the direction of travel of the delivery conveyor 21 and substantially directly over the turnstile 39. After a workpiece frame 27 is placed on the turnstile 39 by the tip-up arm assembly 34, the turnstile motor 63 is energized and turns the output shaft 71 and the drive pinion 73. This turns the ring gear 75 and indexes the turnstile 39 through 90° whereupon the turnstile motor 63 is deenergized. The positioned workpiece frame 27 is then directly in line with the hooks 37 of the overhead trolley conveyor 29 and the turnstile 39 is ready to receive the next workpiece frame 27 from the tip-up arm assembly 34. By the time the next workpiece frame 27 is positioned on the turnstile 39 by the tip-up arm assembly 34, the trolley hooks 37 will have picked the previous workpiece frame 27 from the turnstile whereupon the turnstile 39 is indexed again through 90°, and so on for each succeeding workpiece frame 27.

The delivery conveyor 21, the main tip-up arm assembly 34, the main turnstile 39 and the overhead trolley conveyor 29 are all adapted for automatic synchronized operation to rapidly and continuously effect transfer of the workpiece frames 27 from the delivery conveyor 21 to the overhead trolley conveyor 29. Since the particular drives and drive controls for these devices form no part of the present invention, they are not illustrated nor are they described in detail here. However, for a better understanding of the present invention, a general description of the operation of these devices follows here, it being understood that the skilled engineer is capable of selecting and synchronizing the operation and control thereof.

As described above, the delivery conveyor 21 is driven by means (not shown) in intermittent timed relation to the rate of delivery of the workpiece frames 27 from the forming mill 23 to position the workpiece frames 27 on successive sets of the spaced pocket members 24, 26 fixed to the conveyor chains 28, 30. The delivery conveyor 21 continues operating in intermittent fashion until the first one of the workpiece frames 27 leaves the end thereof and is positioned between the tip-up arms 147, 149 and resting on the slide support structure therebetween. The tip-up arms 147, 149 are normally "down" or substantially horizontal and the workpiece frame 27 moves into engagement with the abutment blocks 209, 211, 213 and above the flop dogs 215, 217, 219 and effects the closing of an appropriately positioned trip switch (not shown). This sets in motion clamping of the workpiece frame 27 by movement of the clamp plates 191, 197 toward each other and thereafter energization of the motors 159, 175 to raise the tip-up arms 147, 149 to the position shown in dot-dash lines in FIGS. 2 and 6. When the tip-up arms 147, 149 reach this position, they effect closing of another trip switch illustrated diagrammatically at 250 which energizes the adjacent one of the motors 105 to raise the associated lift arms 89, 91 and, substantially simultaneously, the clamp plates 191, 197 are withdrawn. The workpiece frame 27 is then raised by the lift pockets 97, 98 and leans against the pads 146 on the upper turnstile frame 79 and, thereafter, the motors 127, 145 effect pivoting of the clamps 117, 119 to hold the workpiece frame in place.

Full lifting action of the lift arms 89, 91 effects closing of a further trip switch (not shown) which energizes the turnstile motor 63 causing the turnstile 39 to index. At the same time, the motors 159, 179 are reversed and the tip-up arms 147, 149 swing downwardly to receive the next workpiece frame 27 from the delivery conveyor 21. The turnstile 39 continues turning under the action of the motor 63 until a trip switch, shown schematically at 254 in FIGS. 2 and 6, is engaged and thrown by a switch actuator on the turnstile 39. This indicates that the turnstile 39 has indexed through 90° whereupon the motor 63 is deenergized and the turnstile stops.

The overhead trolley conveyor 29 operates in synchronism with the turnstile 39 so that when the turnstile 39 has indexed 90°, one of the trolleys 251 and its associated hook 37 is near and ready to lift the indexed workpiece frame 27 from the turnstile. At this position, the trolley 251 closes a trip switch (not shown) reversing the clamp motors 127, 145 and opening the clamps 117, 119 so that the workpiece frame 27 can easily be lifted from the turnstile 39 by the hooks 37. These motors 127, 145 have sufficient "give," however, so that if they are not effectively reversed, the clamps 117, 119 will be wedged outwardly to release the workpiece frame 27.

The tip-up arms 147, 149, as described, already have begun moving downwardly after the first workpiece frame 27 was removed therefrom in preparation to receiving the second workpiece frame 27 from the delivery conveyor 21. If the tip-up arms 147 are not fully "down" when this second workpiece frame 27 is in position therebetween, the leading edge of the workpiece frame engages and pivots the flop dogs 215, 217, 219 and by camming action allows the tip-up arms 147, 149 to move fully "down." This, again, initiates clamping of the workpiece frame 27 by the clamp plates 191, 197 and raising of the tip-up arms 147, 149. This second workpiece frame 27 is placed on the turnstile 39 in the same fashion as the first and thereafter the turnstile 39 is indexed through another 90°. This indexing movement effects operation of still another trip switch to reverse the motor 105 and lower the first set of lift arms 89, 91 so that they are positioned properly when the turnstile 39 has been indexed through four 90° sequences.

In most instances, the frame tip-up arm assembly 34 and the turnstile 39 have been found to be adequate to effect transfer of workpieces, such as, for example, the workpiece frames 27 from the delivery conveyor 21 to the overhead trolley conveyor 29 at a rate compatible with the rate at which these workpiece frames emerge from the forming mill 23. However, if for any reason the transfer device cannot handle these workpieces at a sufficiently rapid rate, for example, because of the relatively heavy weight of the workpieces or because of the relatively long dwell periods required in the operation of the workpiece transfer components, an auxiliary tip-up arm assembly 42 and turnstile 41 can be provided to transfer selected ones of the workpiece frames 27 to the overhead trolley conveyor 29 and relieve stress on the main tip-up arm assembly 34 and turnstile 39.

This auxiliary system is shown generally in FIG. 1 and in further detail in FIGS. 9–14 and is seen to include a base 257 on which a pair of tip-up arms 259, 261 are pivotally supported through spaced bearing blocks 263, 265, respectively. A pair of conjointly operating hydraulic motors 267, 269 have their cylinders 271, 273 pivotally secured to pivot supports, only one of which is shown at 277 and which are fixed to the base 257. The motors 267, 269 have piston rods 279, 281 pivotally secured by pivot pins 278, 280 to spaced plates 283, 285 and 287, 289, fixed to the tip-up arms 259, 261, respectively. Thus, when the motors 267, 269 are energized and the piston rods 279, 281 extended, the tip-up arms 259, 261 are caused to swing upwardly or clockwise as seen in FIG. 10 to the position shown partially in dot-dash lines in FIGS. 10 and 12. Conversely, when the piston rods 279, 281 are retracted, the arms 259, 261 swing downwardly or counter-clockwise as seen in the figures. A pair of stops 291, 293 are fixed to the base 257 and limit movement of and support the tip-up arms 259, 261 in their down position.

The tip-up arms 259, 261 are adapted to receive selected ones of the workpiece frames 27 from the auxiliary conveyor 31 and deliver them to the auxiliary turnstile 41. To this end, the arms 259, 261 are provided with generally U-shaped clamp plates 295, 297 mounted on the ends of piston rods 297, 299 of fluid motors 301, 303. The clamp plates 295, 297 are adapted, when the piston rods 297, 299 are extended, to grip and hold a workpiece frame 27 positioned therebetween. The leading end of the workpiece frame 27 is adapted to seat in a generally channel-shaped pocket formed by a plurality of abutment blocks 305, 307, 309 and a plurality of pivotally mounted flop dogs 311, 313, 315. As shown, the abutment blocks 305, 307, 309 are each fixed to a respective one of a plurality of posts 317, 319, 321, each of which is secured to a cross beam 323 extending between and fixed to the arms 259, 261 in a suitable manner. The flop dogs 311, 313, 315 are each fixed to a shaft 325 turnably supported by spaced bearing blocks 326, 327, 328 fixed to the posts 317, 319, 321. A counterweight 329 is fixed to the shaft 325 and normally biases the flop dogs in a counterclockwise direction as shown in FIG. 10 but permits them to pivot in a clockwise direction should the leading end of the workpiece frame 27 delivered by the conveyor 31 be in position between the tip-up arms 259, 261, before they have swung completely down in the same manner as described above for the tip-up arm assembly 34.

In use, a workpiece frame 27 is fed between the arms 259, 261 by the auxiliary conveyor 31. The leading end of the workpiece frame 27 seats against the abutment blocks 305, 307, 309 and the clamp plates 295, 297 are moved toward and grip the workpiece frame. Thereafter, the motors 267, 269 are energized and swing the tip-up arms 259, 261 upwardly to deliver the workpiece frame 27 to the auxiliary turnstile 39.

Workpiece frame guiding and supporting structure is provided adjacent the end of the auxiliary conveyor 31 and between the tip-up arms 259, 261 similar to that illustrated and described above adjacent the main conveyor 21 and between the arms 147, 149. Since the construction and function of this structure is in all respects the same as that described above and since it forms no part of this invention, a detailed description thereof is omitted here.

The auxiliary turnstile 41 is shown in detail in FIGS. 9 and 12–14 and includes a base 331 having an outer annular ring 333 supported thereabove by a plurality of legs 335 suitably interconnected therewith. An inner ring 337 is rotatably supported within the outer ring 333 by balls 339 and has an internal ring gear 341 formed thereon (see FIG. 9). A reversible hydraulic motor 343 is supported on the base 331 and has an output shaft 345 drivingly connected to the input shaft 347 of a speed reducer 349. An output shaft 351 of the speed reducer has a drive pinion 353 fixed thereto and in meshing engagement with the internal ring gear 341. Thus, the reversible motor 343 is adapted to impart reversible turning movement to the inner ring 337 and therefore to the auxiliary turnstile in a manner described below.

The inner ring 337 has a generally V-shaped lower turnstile frame 355 supported thereon and fixed thereto for turning movement therewith (see FIGS. 12 and 13). A pair of arms 357, 359 extend substantially vertically upwardly from the ends of the V-shaped frame 355 and are interconnected at their top and bottom by struts 361, 363, respectively.

A pair of lift arms 365, 367 are pivotally disposed on a pivot rod 369 supported at its ends on the frame 355 by a pair of pivot supports 371, 373. The outer ends of the lift arms 365, 367 have identical but reversed lift pockets 375, 377 fixed thereto and are adapted to receive and support the lower end of the workpiece frame 27 transferred thereto by the tip-up arms 259, 261. A pair of fluid motors 379, 381 are provided to conjointly pivot the lift arms 365, 367. These motors 379, 381 include cylinders 383, 385 pivoted through pins 387, 389 to a strut 391 extending between and fixed to the arms 357, 359, and piston rods 393, 395 pivoted by pins 397, 399 to brackets, only one of which is shown at 403, fixed to the lift arms 365, 367, respectively.

As described above, the auxiliary conveyor 31 delivers selected ones of the workpiece frames 27 to the auxiliary tip-up arms 259, 261. The leading end of the selected workpiece frame 27 seats against the abutment blocks 305, 307, 309 and the clamp plates 295, 297 are moved inwardly to grip and hold the workpiece frame. Thereafter, the motors 267, 269 are energized and swing the tip-ups arms 259, 261 upwardly or clockwise as seen in FIGS. 10 and 12 to the position shown therein in dot-dash lines. At this point, the lift arms 365, 367 and the lift pockets 375, 377 are in a lowered or down position, the piston rods 393, 395 being extended from the cylinders 383, 385. When the tip-up arms 259, 261 reach this upward position, the motors 379, 381 are energized to retract the piston rods 393, 395 causing the lift arms 365, 367 to swing upwardly to the position shown in the figure. This causes the lift pockets 375, 377 to engage the lower end of the workpiece frame 27 and lift it from the abutment blocks 305, 307, 309 to the position shown in dot-dash lines in FIG. 12. When the motors 379, 381 are energized to raise the lift arms 365, 367, the piston rods 297, 299 are retracted thereby releasing the clamp arms 295, 297 from the workpiece frame 27. When the workpiece frame 27 is lifted from the abutment blocks 305, 307, 309, the intermediate portion of the workpiece frame 27 moves against and is supported against pads 396 on the upper strut 361 and is releasably held there by a pair of clamp arms, only one of which is shown at 407. These clamp arms 407 are each pivotally supported on the arms 357, 359 by a pivot pin 411 and are adapted to move under the action of a pair of identical fluid motors 415. Thus, these motors each have a cylinder 419 pivoted by a pin 423 to its respective arm 359 and a piston rod 427 pivoted by a pin 431 to each clamp arm 407. When the workpiece frame 27 is placed against the upper strut 361, both these motors 415 are energized to extend their piston rods 427 thereby swinging the clamp arms outwardly to hold the workpiece frame 27 and prevent it from falling away from the turnstile 41.

When this has been completed, the arms 259, 261 swing downwardly or counterclockwise as seen in FIGS. 10 and 12 in preparation to receive the next selected workpiece frame 27 from the conveyor 31. With a workpiece frame 27 in place on the auxiliary turnstile 41, the motor 343 is energized and turns or indexes the frame 355 counterclockwise as seen in FIG. 13 through 90°. This locates the workpiece frame 27 directly under the overhead trolley conveyor 29 and ready to be picked up by one of the hooks 37. After the workpiece frame 27 is picked up by the hook 37, the auxiliary turnstile 41 is indexed back by reverse operation of the motor 343 and is ready to receive the next selected workpiece frame 27 from the auxiliary tip-up arm assembly 42.

In practice, when it is necessary to use the auxiliary system, the auxiliary conveyor 31 preferably receives every third workpiece frame 27 delivered from the forming mill 23, these workpiece frames being placed on the auxiliary conveyor 31 automatically by the walking beam conveyor 44. This conveyor 44 conventionally includes arms 409, 413 which is novel under the workpiece frame 27 to be transferred and is raised by lift means (not shown) and thereafter carries the workpiece frame away from the conveyor 21 and lowers and places it on support rails 417, 421. The arms 409, 413 then recycle to below the next workpiece frame 27 to be removed from the conveyor 21 and when the arms are again lifted, they lift the first workpiece frame 27 on the support rails 417, 421 so that both workpiece frames are on the support rails 417, 421. This sequence continues until the first, and thereafter the second workpiece frame 27, and so on, are placed one at a time on the auxiliary conveyor 31. The main tip-up arm assembly 34 and turnstile 39 is operated to transfer the other workpiece frames 27, namely, the first and second, the fourth and fifth, seventh and eighth, and so on, from the delivery conveyor 21 to the overhead trolley conveyor 29. In this manner, the tip-up arms 147, 149 of the main tip-up assembly 34 can be "down" and waiting for the first workpiece frame 27 delivered from the delivery conveyor 21 and place it to the main turnstile 39 as soon as the appropriate control switches are actuated. The second workpiece frame 27 on the delivery conveyor 21 can be delivered to the position between the arms 147, 149 and supported on the slide guides while the tip-up arms are yet returning from the first workpiece frame tip-up sequence, the pivotal action of the flop dogs 215, 217, 219 allowing the tip-up arms 147, 149 to return to their "down" position with this second workpiece frame 27 in place therebetween. While the tip-up arms 147, 149 are moving down, the main turnstile is indexed 90° and the tip-up arms 147, 149 grasp the second workpiece frame 27 and swing upwardly again and place this second workpiece frame on the main turnstile 39. The third workpiece frame 27 will have been removed from the main conveyor 21 and is delivered by the auxiliary conveyor 31 to the tip-up arms 259, 261 of the auxiliary tip-up arm assembly 42, which, at this point, is "down" and waiting. These tip-up arms 259, 261 then swing upwardly and place this third workpiece frame 27 on the auxiliary turnstile 41 which indexes and transfers it to a position ready for pick-up by a hook 37 on the overhead trolley conveyor 29. The fourth and fifth workpiece frames are transferred by the main tip-up arm assembly 34 and turnstile 39 to the overhead conveyor 29 and the sixth by the auxiliary tip-up arm assembly 42 and turnstile 41, and so on. During the interval when the third workpiece frame would be delivered to the main tip-up cam assembly 34 were it allowed to remain on the delivery conveyor 21, the main tip-up arms 147, 149 have ample time to return to their "down" position ready to receive the fourth workpiece frame 27 when delivered by the delivery conveyor 21. Thus, the speed at which these tip-up arms 147, 149 must swing to remove the remaining workpiece frames 27 from the delivery conveyor 21 is reduced considerably as compared to what it would have to be were all the workpiece frames 27 left for the main tip-up arm assembly 34. The auxiliary tip-up arm assembly 42, when used, receives only every third workpiece frame 27 and has ample time to cycle without placing any excessive strain on the moving parts. Thus, even under most extreme conditions, that is, when the delivery conveyor delivers extremely heavy workpieces at a very rapid rate, the transfer mechanism of the present invention is able to effect complete transfer of these workpieces to the overhead trolley conveyor with no loss of time.

As was the case with the main tip-up arm assembly 34 and the main turnstile 39, the auxiliary tip-up arm assembly 42 and the auxiliary turnstile 41 are adapted for fully automatic operation and for purposes of illustration and a better understanding of the invention, a brief description is given here. Thus, a suitable switch (not shown) can be tripped by passage of every third workpiece frame 27 along the delivery conveyor 21 to energize the walking beam shuttle 44 which removes this workpiece frame 27 from the delivery conveyor 21 and places it on the auxiliary conveyor 31. This conveyor 31 can be a continuously moving type and delivers this workpiece frame 27 to a position between the tip-up arms 259, 261 which are "down" and waiting in much the same manner as the main tip-up arm assembly 34 described above. Proper positioning of this workpiece frame 27 energizes the clamp plate motors and the motors 267, 269 to raise the tip-up arms 259, 261 to the dot-dash position shown in FIGS. 10 and 12. At this point, the lift arms 365, 367 are down, the piston rods 393, 395 being extended from the motors 379, 381. When the tip-up arms 259, 261 are fully "up" as shown in FIGS. 10 and 12, they cause actuation of another switch shown diagrammatically at 432 which energizes motors 379, 381 and retracts the piston rods 393, 395 thereby raising the lift arms 365, 367 and lifting the workpiece frame 27 from the tip-up arms 259, 261. The clamp plates 295, 297 will have been released from the workpiece frame 27 so that it is now in the position shown in dot-dash lines in FIG. 12 resting against the upper turnstile strut 361. When the lift arms 365, 367 are fully "up", the motors 267, 269 are reversed causing the tip-up arms 259, 261 to swing downwardly and the auxiliary turnstile motor 343 to be energized. This effects indexing of the auxiliary turnstile 41 through 90° when it trips a switch, such as that shown at 435 in FIG. 11 to deenergize the motor 343. The third hook 37 on the overhead trolley conveyor 29 will, of course, have passed the main turnstile 39 without picking up one of the workpiece frames 27 and will now be in position to grasp and pick up the workpiece frame 27 on the auxiliary turnstile 41. Still another switch (not shown) can be actuated by this hook 37 or its trolley 251 so that after this third workpiece frame 27 has been picked up, the auxiliary turnstile motor 343 is reversed and returns the auxiliary turnstile 41 to its original position ready to receive the sixth workpiece frame 27, and so on. This procedure continues until all the workpiece frames 27 emerging from the forming mill 23 have been effectively transferred to the overhead trolley conveyor 29.

The above-described structure and operation was particularly directed to transfer of the workpiece frames 27 from the delivery conveyor 21 and the auxiliary conveyor 31, if necessary, to the overhead trolley conveyor 29. However, it might be necessary to transfer these workpiece frames 27 back to one or more flat bed type conveyors when they reach the return side 32 of the overhead conveyor 29 pursuant to delivery thereof to a stacking or other receiving station. Since the problems of transfer of these workpiece frames 27 from a substantially vertical position on the overhead trolley conveyor to a substantially horizontal position on a flat bed type conveyor are the same as in transferring them from a substantially horizontal position to a substantially vertical position as described above, the structure used to accomplish the desired results can also be the same, the only difference being that the mode of operation and controls therefor are reversed.

Thus, the main turnstile 40 and main tip-down arm assembly 43 are identical with the main turnstile 39 and main tip-up arm assembly 34 described above. The main turnstile 40 may receive all the workpiece frames 27 or, if desired, only the first and second, fourth and fifth, etc. from the hooks 37. As each workpiece frame 27 is placed on the turnstile 40, it indexes 90° whereupon the tip-down arms of the assembly 43 grip the workpiece frames 27, and swing them down and place them on an intermittent conveyor 33. The auxiliary turnstile 45, if one is used, receives every third workpiece frame 27 from the overhead trolley conveyor and indexes automatically to a position where the workpiece frame 27 is gripped by the tip-down arms of the tip-down arm assembly 46 whereupon these arms swing down and place the workpiece frame 27 on the conveyor 35. Since these transfer devices are in all respects identical to the ones described above in detail, and since the mode of operation thereof is simply the reverse of the ones described above in detail, a detailed description thereof is omitted here.

While a preferred embodiment of the present invention has been illustrated and described above in detail, various additions, substitutions, modifications and omissions may be made thereto without departing from the spirit of the invention as encompassed by the appended claims.

What is claimed is:

1. A workpiece transfer device comprising a turnstile, a workpiece delivery conveyor for transferring workpieces to said turnstile in a non-upright position, said turnstile adapted to support at least one workpiece thereon in a generally upright position and indexable in increments of less than 360° and constructed to transfer workpieces between said generally upright position thereon and said receiving conveyor, a tip-arm assembly adjacent said turnstile adapted to transfer workpieces between said delivery conveyor and said generally upright position, and a workpiece receiving conveyor for transferring workpieces away from said turnstile.

2. A workpiece transfer device comprising a turnstile, a flat bed type delivery conveyor for transferring workpieces to said turnstile, an overhead trolley type receiving conveyor for transferring workpieces away from said turnstile, said turnstile adapted to support at least one workpiece thereon in a generally upright position and indexable in increments of less than 360° and constructed to transfer workpieces between said generally upright position thereon and said receiving conveyor, and a tip-arm assembly adjacent said turnstile adapted to releasably grip and transfer workpieces between said delivery conveyor and said generally upright position.

3. In a workpiece transfer device comprising a workpiece delivery conveyor and a workpiece receiving conveyor, the improvement comprising a turnstile adapted to support at least one workpiece in a generally upright position and indexable in increments less than 360° from said delivery conveyor to said receiving conveyor, a tip-arm assembly adjacent said turnstile adapted to support and transfer workpieces from said delivery conveyor to said turnstile, and means on said turnstile adapted to receive said workpieces from said tip-arm assembly and releasably support the said workpieces in said generally upright position as said turnstile is indexed from said delivery conveyor to said receiving conveyor.

4. A workpiece transfer device comprising a workpiece delivery conveyor, a workpiece receiving conveyor, a turnstile intermediate said conveyors and adapted to support at least one workpiece thereon in a generally upright position and indexable in increments of less than 360° and constructed to transfer workpieces between said generally upright position thereon and said receiving conveyor, a tip-arm assembly adjacent said turnstile adapted to transfer workpieces between said delivery conveyor and said generally upright position, releasable gripping means on said tip-arm assembly adapted to hold said workpieces during transfer thereof between said delivery conveyor and said generally upright position on said tip-arm assembly, and abutment means on said tip-arm assembly for engaging and positioning one end of said workpieces and supporting said workpieces on said tip-arm assembly when in said last-mentioned generally upright position.

5. A workpiece transfer device comprising a turnstile intermediate a workpiece delivery and workpiece receiving conveyor, said turnstile adapted to support at least one workpiece thereon in a generally upright position and indexable in increments of less than 360° and constructed to transfer workpieces between said generally upright position thereon and said receiving conveyor, a tip-arm assembly adjacent said turnstile adapted to support and transfer workpieces between said delivery conveyor and a generally upright position, releasable holding means on said turnstile to hold said workpieces thereagainst and lift means on said turnstile adapted to raise said workpieces from said tip-arm assembly from said generally upright position on said tip-arm assembly to said generally upright position on said turnstile.

6. A workpiece transfer device comprising a workpiece delivery conveyor, a workpiece receiving conveyor, an upright turnstile intermediate said conveyors and adapted to support workpieces thereon in a generally upright position at each side thereof and indexable through successive increments of 90° and constructed to transfer workpieces between said generally upright position thereon and said receiving conveyor, and a tip-arm assembly adjacent said turnstile adapted to transfer workpieces between said delivery conveyor and said generally upright position.

7. A workpiece transfer device comprising a workpiece delivery conveyor, a workpiece receiving conveyor, an upright turnstile intermediate said conveyors and adapted to support workpieces thereon in a generally upright position at each side thereof and indexable through successive increments of 90° and constructed to transfer workpieces between said generally upright position thereon and said receiving conveyor, a tip-arm assembly adjacent said turnstile adapted to transfer workpieces between said delivery conveyor and said generally upright position on said turnstile and means for indexing said turnstile through one increment of 90° after each workpiece is transferred between said turnstile and said tip-arm assembly.

8. A workpiece transfer device comprising a workpiece delivery conveyor, a workpiece receiving conveyor, an upright turnstile intermediate said conveyors and adapted to support workpieces thereon in a generally upright position at each side thereof and indexable through successive increments of 90° and constructed to transfer workpieces between said generally upright position thereon and said receiving conveyor, a tip-arm assembly adjacent said turnstile adapted to transfer workpieces between said delivery conveyor and said generally upright position on said turnstile, means for indexing said turnstile through one increment of 90° after each workpiece is transferred between said turnstile and said tip-arm assembly, said turnstile positioned to transfer said workpiece to said receiving conveyor and to receive another workpiece from said tip-arm assembly when indexed said one 90° increment.

9. A workpiece transfer device comprising a workpiece delivery conveyor, a workpiece receiving conveyor, a turnstile adapted to support at least one workpiece thereon in a generally upright position and indexable in increments of less than 360° and constructed to transfer workpieces in said generally upright position between said delivery conveyor and said receiving conveyor, and a pivotal arm assembly adjacent said turnstile movable through approximately 90° and adapted to transfer workpieces between one of said conveyors and said turnstile.

10. A workpiece transfer device comprising a workpiece delivery conveyor, a workpiece receiving conveyor, a turnstile intermediate said conveyors and adapted to support at least one workpiece thereon in a generally upright position and reversely indexable through an increment of 90° and constructed to transfer workpieces between said generally upright position thereon and said receiving conveyor, and a tip-arm assembly adjacent said turnstile adapted to transfer workpieces between said delivery conveyor and said generally upright position.

11. A workpiece transfer device comprising a workpiece delivery conveyor, a workpiece receiving conveyor, a generally rectangular upright turnstile intermediate said conveyors and adapted to support at least one workpiece thereon in a generally upright position and reversely indexable and means for indexing said turnstile in one direction through 90° after each workpiece is transferred between said turnstile and said tip-arm assembly, thereafter returning to its original position, and constructed to transfer workpieces between said generally upright position thereon and said receiving conveyor, and a top-arm assembly adjacent said turnstile adapted to transfer workpieces between said delivery conveyor and said generally upright position.

12. A workpiece transfer device comprising a workpiece delivery conveyor, a workpiece receiving conveyor, an upright turnstile intermediate said conveyors and having at least one workpiece supporting and holding means thereon and adapted to maintain a workpiece in a generally upright position, means for indexing said turnstile about a generally vertical axis through increments of less than 360°, said turnstile being adapted to transfer workpieces between said generally upright position thereon and said receiving conveyor when in one indexed position, and a tip-arm assembly adjacent said turnstile pivotable between a generally horizontal position and a generally vertical position, said tip-arm assembly including a pair of laterally spaced arms having means thereon to hold said workpieces and adapted to transfer workpieces between said delivery conveyor and said turnstile.

13. A workpiece transfer device comprising a workpiece delivery conveyor, a workpiece receiving conveyor, an upright turnstile intermediate said conveyors and having at least one workpiece supporting and holding means thereon and adapted to maintain a workpiece in a generally upright position, means for indexing said turnstile about a generally vertical axis through increments of less than 360°, said turnstile being adapted to transfer workpieces between said generally upright position thereon and said receiving conveyor when in one indexed position, and a tip-arm assembly adjacent said turnstile pivotable between a generally horizontal position and a generally vertical position, said tip-arm assembly including a pair of laterally spaced arms, each having releasable clamp plates thereon to hold said workpieces and abutment means to position and support one end of said workpieces, and adapted to transfer workpieces between said delivery conveyor and said turnstile.

14. A workpiece transfer device comprising an upright turnstile intermediate a workpiece delivery and a workpiece receiving conveyor, said turnstile having at least one workpiece supporting and holding means thereon and adapted to maintain a workpiece in a generally upright position, means for indexing said turnstile about a generally vertical axis through increments of less than 360°, said turnstile being adapted to transfer workpieces between said generally upright position thereon and said receiving conveyor when in one indexed position, and a tip-arm assembly adjacent said turnstile pivotable between a generally horizontal position and a generally vertical position, said tip-arm assembly including a pair of laterally spaced arms having means thereon to hold said workpieces and abutment means to position and support one end of said workpieces, said abutment means including an abutment block and at least one pivotally mounted dog disposed beneath said abutment block, said at least one dog and said abutment block together forming a channel-shaped recess receiving and supporting one end of said workpiece, said tip-arm assembly adapted to transfer workpieces between said delivery conveyor and said turnstile.

15. A workpiece transfer device comprising an upright turnstile intermediate a workpiece delivery and a workpiece receiving conveyor, said turnstile having at least one workpiece supporting and holding means thereon and adapted to maintain a workpiece in a generally upright position, means for indexing said turnstile about a generally vertical axis through increments of less than 360°, said turnstile being adapted to transfer workpieces between said generally upright position thereon and said receiving conveyor when in one indexed position, and a tip-arm assembly adjacent said turnstile pivotable between a generally horizontal position and a generally vertical position, said tip-arm assembly including a pair of laterally spaced arms having means thereon to hold said workpieces and abutment means to position and support one end of said workpieces, said abutment means including an abutment block and at least one pivotally mounted dog disposed beneath said abutment block, said at least one dog and said abutment block together forming a channel-shaped recess receiving and supporting one end of said workpiece, said at least one dog having a cam surface thereon engageable with said one end of said workpiece permitting movement of said dog past said workpiece in one direction, said tip-arm assembly adapted to transfer workpieces between said delivery conveyor and said turnstile.

16. A workpiece transfer device comprising an upright turnstile intermediate a workpiece delivery and a workpiece receiving conveyor, said turnstile having at least one pair of lift arms pivotally mounted thereon and each provided with pocket means adapted to receive and support one end of said workpiece, said turnstile adapted to maintain a workpiece in a generally upright position, means for indexing said turnstile about a generally vertical axis through increments of less than 360°, said turnstile being adapted to transfer workpieces between said generally upright position thereon and said receiving conveyor when in one indexed position, and a tip-arm assembly adjacent said turnstile pivotable between a generally horizontal position and a generally vertical position, said tip-arm assembly including a pair of laterally spaced arms having means thereon to hold said workpieces and adapted to transfer workpieces between said delivery conveyor and said turnstile, and abutment means to position and support one end of said workpieces, said lift arms adapted to transfer said workpieces between said abutment means on said tip-arm assembly and said turnstile.

17. A workpiece transfer device comprising an upright turnstile, first and second conveyors for transferring workpieces to and from said turnstile, said turnstile having at least one workpiece supporting means thereon and adapted to releasably hold a workpiece in a generally upright position, means for indexing said turnstile about a generally vertical axis through increments of less than 360°, said turnstile being adapted to transfer workpieces between said generally upright position thereon and said receiving conveyor when in one indexed position, and a tip-arm assembly adjacent said turnstile pivotable between a generally horizontal position and a generally vertical position, said tip-arm assembly including a pair of laterally spaced arms having means thereon to hold said workpieces and adapted to transfer workpieces between said delivery conveyor and said turnstile.

18. A workpiece transfer device comprising a first upright turnstile intermediate a first workpiece delivery conveyor and a workpiece receiving conveyor, said first turnstile having a plurality of workpiece supporting and holding means thereon and adapted to maintain a workpiece in a generally upright position, means for indexing said first turnstile about a generally vertical axis through successive increments of less than 360°, said first turnstile being adapted to transfer workpieces between said generally upright position thereon and said receiving conveyor when said workpieces are in one indexed position, a first tip-arm assembly adjacent said first turnstile and pivotable between a generally horizontal position and a generally vertical position and adapted to transfer workpieces between said first delivery conveyor and said second turnstile, a second upright turnstile intermediate a second delivery conveyor and said receiving conveyor, said second turnstile having a workpiece supporting and holding means thereon and adapted to maintain a workpiece in a generally upright position, means for reversely indexing said second turnstile about a generally vertical axis through an increment of less than 360°, said second turnstile being adapted to transfer workpieces between said generally upright position on said second turnstile and said receiving conveyor when in one indexed position, a second tip-arm assembly adjacent said second turnstile and pivotable between a generally horizontal position and a generally vertical position and adapted to transfer workpieces between said second delivery conveyor and said second turnstile, said second delivery conveyor being adapted to receive selected ones of said workpieces from said first delivery conveyor.

19. A workpiece transfer device comprising a first upright turnstile intermediate a first workpiece delivery conveyor and a workpiece receiving conveyor, said first turnstile having a plurality of workpiece supporting and holding means thereon and adapted to maintain a workpiece in a generally upright position, means for indexing said first turnstile about a generally vertical axis through successive 90° increments, said first turnstile being adapted to transfer workpieces between said generally upright position thereon and said receiving conveyor when said workpieces are in one indexed position, a first tip-arm assembly adjacent said first turnstile and pivotable between a generally horizontal position and a generally vertical position and adapted to transfer workpieces between said first delivery conveyor and said second turnstile, a second upright turnstile intermediate a second delivery conveyor and said receiving conveyor, said second turnstile having a workpiece supporting and holding means thereon and adapted to maintain a workpiece in a generally upright position, means for reversely indexing said second turnstile about a generally vertical axis through a 90° increment, said second turnstile being adapted to transfer workpieces between said generally upright position on said second turnstile and said receiving conveyor when in one indexed position, a second tip-arm assembly adjacent said second turnstile and pivotable between a generally horizontal position and a generally vertical position and adapted to transfer workpieces between said second delivery conveyor and said second turnstile, said second delivery conveyor being adapted to receive selected ones of said workpieces from said first delivery conveyor.

20. A workpiece transfer device comprising a first upright turnstile intermediate a first workpiece delivery conveyor and a workpiece receiving conveyor, said first turnstile having a plurality of workpiece supporting and holding means thereon and adapted to maintain a workpiece in a generally upright position, means for indexing said first turnstile about a generally vertical axis through successive increments of less than 360°, said first turnstile being adapted to transfer workpieces between said generally upright position thereon and said receiving conveyor when said workpieces are in one indexed position, a first tip-arm assembly adjacent said first turnstile and pivotable between a generally horizontal position and a generally vertical position and adapted to transfer workpieces between said first delivery conveyor and said second turnstile, a second upright turnstile intermediate a second delivery conveyor and said receiving conveyor, said second turnstile having a workpiece supporting and holding means thereon and adapted to maintain a workpiece in a generally upright position, means for reversely indexing said second turnstile about a generally vertical axis through an increment of less than 360°, said second turnstile being adapted to transfer workpieces between said generally upright position on said second turnstile and said receiving conveyor when in one indexed position, a second tip-arm assembly adjacent said second turnstile and pivotable between a generally horizontal position and a generally vertical position and adapted to transfer workpieces between said second delivery conveyor and said second turnstile.

21. A workpiece transfer device comprising a workpiece receiving conveyor and first and second workpiece delivery conveyors, a first turnstile indexable in increments of less than 360° and adapted to transfer workpieces from said first delivery conveyor to said receiving conveyor, a second turnstile indexable through increments of less than 180° and adapted to transfer workpieces from said second delivery conveyor to said receiving conveyor, and tip-arm means adjacent said first and second turnstiles for transferring workpieces from said delivery conveyors to said turnstiles.

22. The invention as set forth in claim 21 wherein said second turnstile is indexable between a workpiece accepting position wherein a workpiece is received thereby from said tip-arm means, to a workpiece transferring position wherein a workpiece is transferred to said receiving conveyor, and wherein said second turnstile when disposed in said accepting position is out of the path of travel of workpieces being conveyed along said receiving conveyor.

23. The invention as set forth in claim 21 wherein said first turnstile comprises a plurality of workpiece receiving and supporting stations and means for progressively indexing said first turnstile whereby one of said stations is simultaneously moved into registry with said first delivery conveyor as a workpiece is transferred by said first turnstile from said first delivery conveyor to said receiving conveyor, and wherein said second turnstile is reversely indexable between a workpiece accepting position wherein a workpiece is received thereby from said tip-arm means, to a workpiece transferring position wherein a workpiece is transferred to said receiving conveyor.

References Cited
UNITED STATES PATENTS

| | | |
|---|---|---|
| 1,091,671 | 3/1914 | Lamb. |
| 2,356,451 | 8/1944 | Evans et al. |
| 2,361,222 | 10/1944 | McBride. |
| 2,558,503 | 6/1951 | Young _____ 198—25 |
| 2,944,655 | 7/1960 | Griswold _____ 198—177 X |

GERALD M. FORLENZA, *Primary Examiner.*
ALBERT J. MAKAY, *Examiner.*